(12) United States Patent
Mishima

(10) Patent No.: US 6,499,763 B1
(45) Date of Patent: Dec. 31, 2002

(54) PASSENGER PROTECTION DEVICE

(75) Inventor: Masaru Mishima, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/678,675

(22) Filed: Oct. 4, 2000

(30) Foreign Application Priority Data

Oct. 7, 1999 (JP) .......................................... 11-287031

(51) Int. Cl.⁷ .......................... B60R 21/18; B60R 21/32
(52) U.S. Cl. ...................................... 280/733; 280/735
(58) Field of Search ................................ 280/733, 735, 280/731, 741

(56) References Cited

U.S. PATENT DOCUMENTS

| | | | | |
|---|---|---|---|---|
| 3,861,710 A | * | 1/1975 | Okubo ........................ | 280/735 |
| 5,573,269 A | * | 11/1996 | Gentry et al. ............... | 280/735 |
| 5,626,359 A | * | 5/1997 | Steffens, Jr. et al. ........ | 280/735 |
| 5,865,463 A | * | 2/1999 | Gagnon et al. ............. | 280/735 |
| 5,906,393 A | * | 5/1999 | Mazur et al. ............... | 280/735 |
| 5,947,514 A | * | 9/1999 | Keller et al. ................ | 280/735 |
| 6,021,863 A | * | 2/2000 | Stanley ........................ | 280/735 |
| 6,047,985 A | * | 4/2000 | Yoshida ...................... | 280/735 |
| 6,109,647 A | * | 8/2000 | Akaba et al. ............... | 280/733 |
| 6,186,539 B1 | * | 2/2001 | Foo et al. .................... | 280/735 |
| 6,189,922 B1 | * | 2/2001 | Parks et al. ................. | 280/735 |
| 6,199,901 B1 | * | 3/2001 | Iizuka ......................... | 280/735 |
| 6,209,908 B1 | * | 4/2001 | Zumpano .................... | 280/735 |
| 6,259,042 B1 | * | 7/2001 | David ......................... | 280/735 |
| 6,282,473 B1 | * | 8/2001 | Steffens, Jr. ................ | 280/735 |
| 6,311,112 B1 | * | 10/2001 | Mazur et al. ............... | 280/735 |

FOREIGN PATENT DOCUMENTS

| | | | | |
|---|---|---|---|---|
| JP | 5-85301 | | 4/1993 | |
| JP | 11-78769 | | 3/1999 | |
| JP | 11-170948 | | 6/1999 | |
| JP | 2001138863 A | * | 5/2001 | .......... B60R/22/14 |

* cited by examiner

Primary Examiner—Paul N. Dickson
Assistant Examiner—Joselynn Y Sliteris
(74) Attorney, Agent, or Firm—Foley & Lardner

(57) ABSTRACT

To provide a passenger protecting device protecting a passenger by controlling an inflating amount of an airbag and that of an air belt. A protocol is used that varies the amount of inflation of both the airbag and the air-belt. Each may remain non-inflated, inflated at least partially, or inflated fully depending on other factors. One factor may be the detected impact scale of the crash. Another factor may be the detected weight of a passenger. Inflation of the airbag and/or the air-belt may be done in a stepwise manner or in a continuous manner.

22 Claims, 3 Drawing Sheets

PASSENGER PROTECTION DEVICE

BACKGROUND OF THE INVENTION

This application is related to Japanese Application No. H11-287031, filed Oct. 7, 1999, the disclosure of which is herein incorporated by reference in its entirety.

1. Field of the Invention

The present invention relates to passenger protecting devices having an airbag and an air belt that are inflated when a vehicle crashes, and, more particularly, to passenger protection devices controlling the amount of inflating gas generated in each in accordance with a crash impact scale.

2. Description of the Related Art

Seat belt assemblies and airbag devices are used in vehicles such as automobiles, for protecting passengers. When the vehicle crashes, a seat belt locking mechanism is activated to prevent the seat belt from being further extended. Additionally, an inflator of the airbag device is activated to inflate the airbag. Also, various types of air belt assemblies for inflating a portion of a seat belt have been proposed recently.

Japanese Unexamined Patent Publication No. 5-85301 describes an example of an air belt assembly. FIG. 3 is a perspective view showing the air belt assembly of this publication. This air belt assembly 1 includes an air belt 2, a webbing 2a, a lap belt 3, a buckle device 4, a tongue 5, and a through anchor 6. The air belt 2 extends over a passenger's body diagonally from the right side to the left side. The webbing 2a is coupled to the air belt 2. The lap belt 3 extends over the passenger's body from the right side to the left side. The buckle device 4 is secured to, for example, the vehicle's floor. The tongue 5 is inserted in the buckle device 4 when the belts are fastened. The through anchor 6 guides the webbing 2a.

The webbing 2a is formed by a normal type belt like a typical, prior art seat belt and is slidably guided by the through anchor 6. An end of the webbing 2a is secured to a seat belt retractor having an emergency locking mechanism (ELR) 7 fixed to the vehicle body. The retractor 7 thus retracts the webbing 2a. An end of the air belt 2 is connected to the webbing 2a through, for example, sawing, and the other end of the air belt 2 is connected to the tongue 5.

The lap belt 3 is formed by a normal type belt like a typical seat belt. An end of the lap belt 3 is connected to the tongue 5, and the other end of the lap belt 3 is connected to a seat belt retractor (ELR) 8 secured to the vehicle body. A gas generator 9 is coupled to the buckle device 4 and is activated to generate high pressure gas in case of an emergency such as a car crash. A passage extends in the tongue 5 and the buckle device 4 for introducing gas from the gas generator 9 to the air belt 2.

The air belt 2 is formed by a belt-like bag having a relatively large width, which is folded to reduce its width and is encompassed by a cover. The air belt 2 is normally maintained in a belt-like shape. The air belt assembly 1 is used in the same manner as a prior art seat belt assembly. If the gas generator 9 is activated due to, for example, a car crash, the air belt 2 is expanded to protect the passenger, as indicated by the dotted lines.

Japanese Unexamined Patent Publication No. 11-78769 describes a passenger protection device detecting an impact scale during a crash with an acceleration sensor. An acceleration, an acceleration level, an acceleration change, and a decreased speed amount are determined through a control circuit, and the impact scale is thus detected. The amount of the gas generated by an inflator of the airbag device is controlled in accordance with the impact scale. Further, Japanese Unexamined Patent Publication No. 11-170948 describes a passenger protecting device having an airbag and an air belt that remains non-inflated if the vehicle speed is relatively small when a crash occurs. Instead, the device restrains a passenger only with an air belt, which functions simply as a seat belt. If the vehicle speed is intermediate when a crash occurs, the device inflates only the air belt. Further, if the vehicle speed is relatively large when a crash occurs, the device inflates both the airbag and the air belt.

SUMMARY OF THE INVENTION

It is an objective of the present invention to provide a passenger protection device that controls the amount of the gas generated for inflating an air belt, as well as the amount of the gas generated for inflating an airbag, in accordance with a detected impact scale of a crash under different crash scenarios.

A passenger protection device of the present invention has an airbag device having an airbag and an airbag gas generator for inflating the airbag by supplying gas to the interior of the airbag and located forward of a vehicle passenger, an air belt assembly having an inflating portion and an air-belt gas generator inflating the inflating portion by supplying gas to the interior of the inflating portion, and a control unit controlling the airbag gas generator and the air-belt gas generator in response to a crash of the vehicle. The passenger protecting device is characterized in that the amount of gas generated by the air-belt gas generator is adjustable and that the control unit operates to increase the amount of gas generated by the air-belt gas generator in accordance with an increase of an impact caused by the crash.

In this passenger protection device, when the impact scale is relatively small, or when restraint for the passenger need not be increased, a decreased amount of gas is supplied to the air belt such that the passenger is received by the air belt that is expanded loosely. When the impact scale is relatively large, an increased amount of gas is supplied to the air belt such that the passenger is restrained by the air belt that is expanded tightly. This sufficiently absorbs the shock acting on the passenger.

In the passenger protecting device of the present invention, it is preferred that the gas generating amount of the airbag gas generator, as well as that of the air-belt gas generator, is increased in accordance with an increase of the crash impact scale. Accordingly, if the impact scale is relatively small, a decreased amount of gas is supplied to the airbag such that the passenger is received by the airbag that is expanded loosely. However, if the impact scale is relatively large, an increased amount of gas is supplied to the airbag such that the passenger is reliably received by the airbag when hitting the airbag at a relatively high speed.

In the present invention, the gas generating amount of each gas generator may be increased continuously. However, if the gas generating amount is increased in a stepped manner, the manufacturing cost of the device can be reduced.

In the present invention, a weight detecting means may be provided for detecting the weight of the passenger seated in the vehicle. The control unit operates to increase the gas generating amount of at least the air-belt gas generator or the airbag gas generator in accordance with an increase of the weight detected by the weight detecting means.

In this structure, the gas generating amount of the gas generator is controlled in accordance with not only the crash impact scale but also the passenger's weight. Thus, when the impact scale is relatively small, the passenger is received by the loosely expanded airbag or air belt as necessary. Further, when the impact scale is relatively large, an increased shock is absorbed.

The crash impact scale is detected, for example, in relation to an acceleration change determined by detecting an acceleration (deceleration) applied to a vehicle as time elapsed from the time at which the crash occurs.

DETAILED DESCRIPTION OF THE PREFERRED EMBODIMENT

Figure 3:
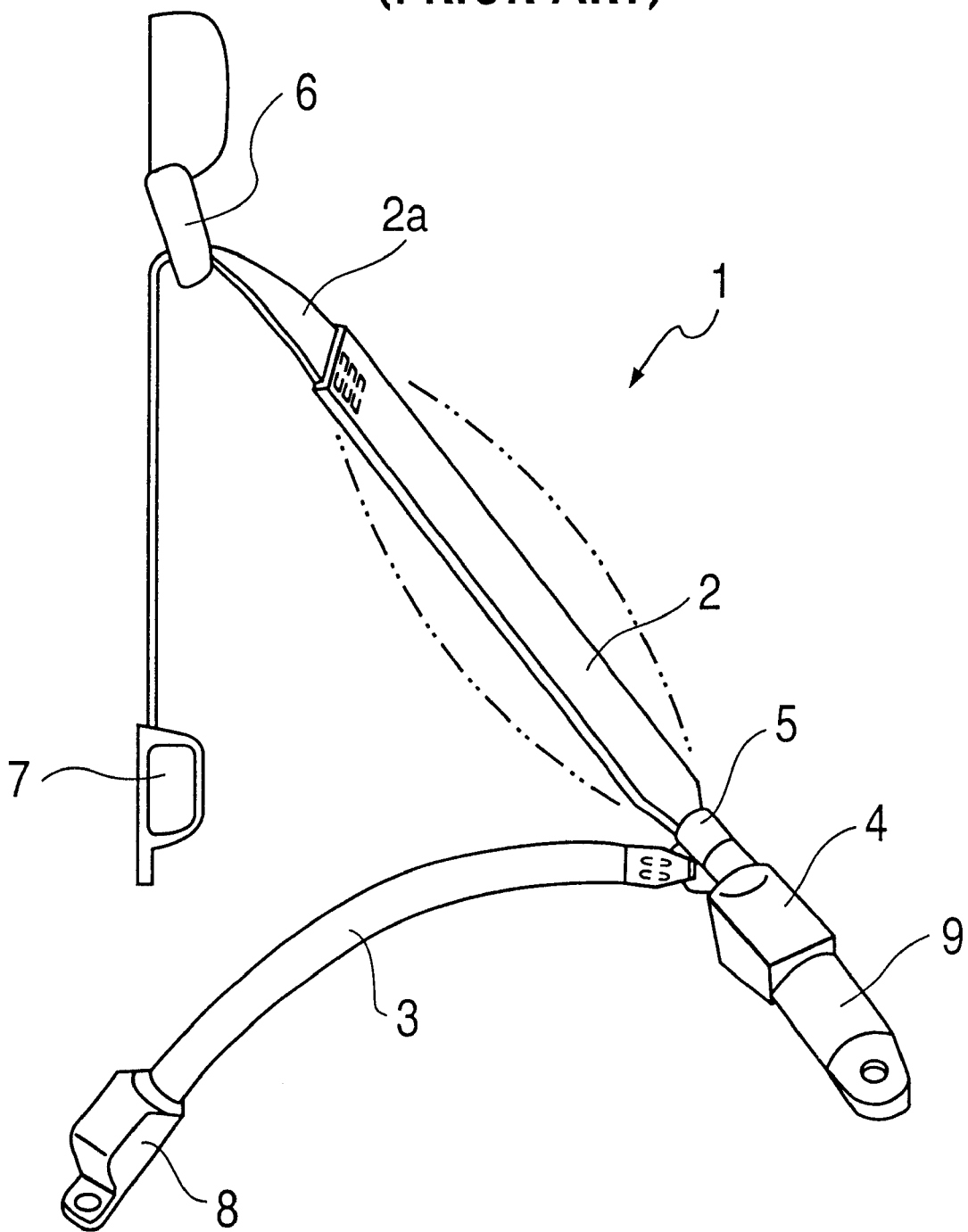
FIG. 3 is a perspective view showing the structure of a prior art air belt assembly.

An embodiment of the present invention will now be described with reference to the attached drawings. A seat 10 is provided with an air belt assembly of FIG. 3. The structure of this air belt assembly is the same as that of FIG. 3, except that a pair of inflators, a first inflator 21 and a second inflator 22, are provided instead of the inflator 9. Thus, common portions of FIGS. 1 and 3 are indicated by common reference numerals, and their description is omitted.

The seat 10 includes a seat cushion 11 and a seat back 12. A weight sensor 13 is provided at a portion of a vehicle body on which the seat 10 is mounted and detects the weight of a passenger P seated in the seat 10.

An airbag device 15 is installed in a steering wheel 14 located forward of the seat 10. The airbag device 15 includes a first airbag inflator 31 and a second airbag inflator 32. The airbag device 15 is a known airbag device having an airbag 16, a retainer to which the airbag 16 and the inflators 31, 32 are secured, and a module cover encompassing the airbag 16 in a folded state. When the inflators 31, 32 are activated, the airbag 16 is inflated to rupture the module cover, and the airbag 16 is expanded toward the front of the passenger P.

Figure 2:
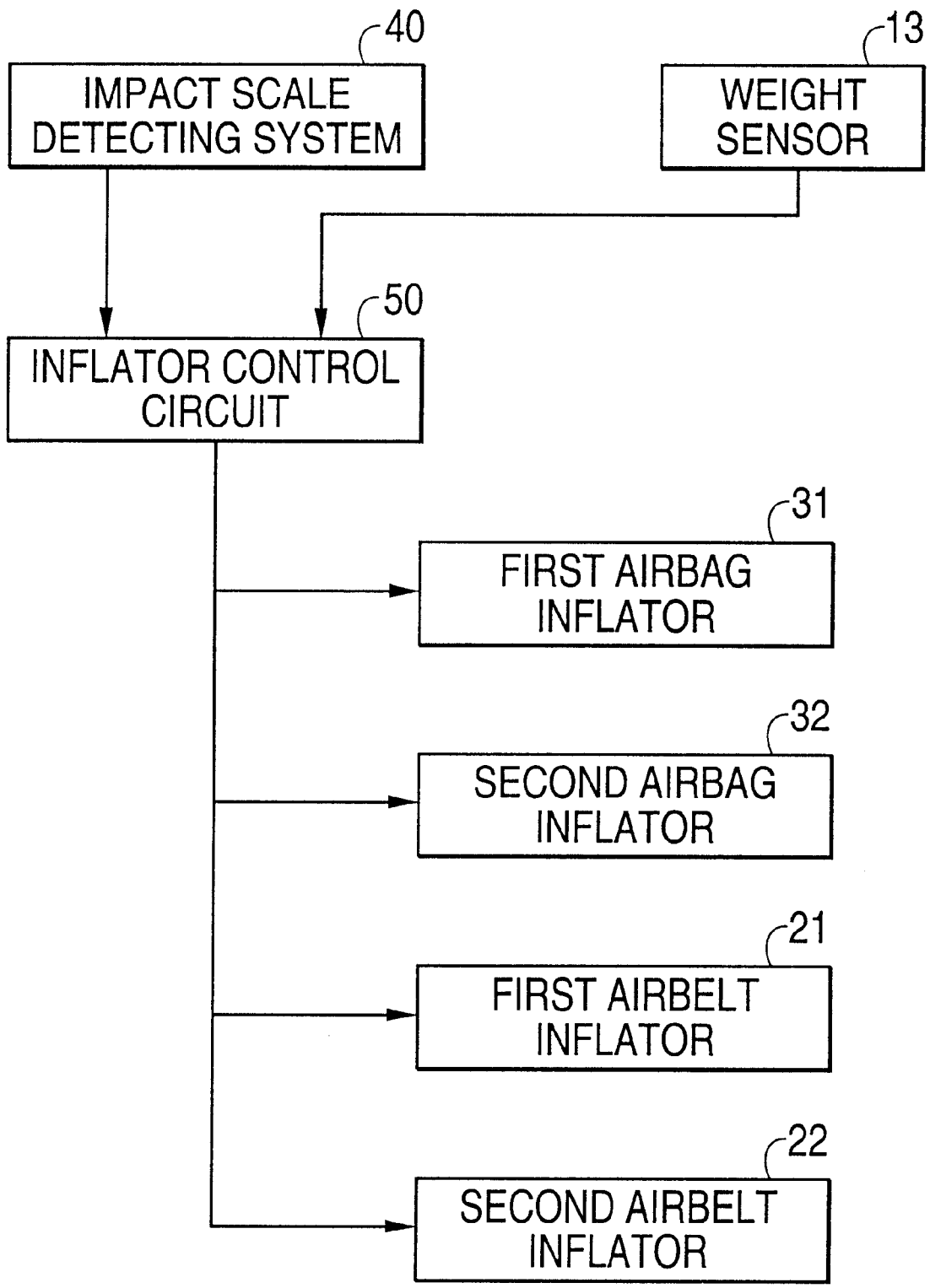
FIG. 2 is a block diagram showing controlling of the passenger protection device of FIG. 1.

As shown in FIG. 2, an output signal from an impact scale detecting system 40, which is provided in a vehicle for detecting an impact scale in accordance with an acceleration (deceleration) during a crash, is sent to an inflator control circuit 50, together with a detection signal from the weight sensor 13. The inflators 21, 22, 31, 32 are controlled in accordance with these signals. Operation examples of this passenger protecting device will hereafter be described.

OPERATION EXAMPLE 1

Figure 1A:
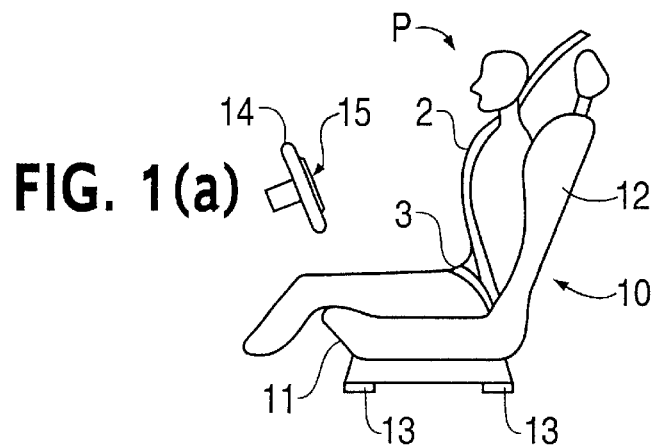
FIGS. 1(a) to 1(d) are side views showing a seat having a passenger protecting device of an embodiment according to the present invention.

Control Example Non-dependent on the Passenger's Weight (1) When a crash occurs, the impact scale is detected by the impact scale detecting system 40. When the impact scale is slight (less than a slight value), the inflators 21, 22, 31, 32 remain deactivated, and the airbag 16 and the air belt 2 remain noninflated, as shown in FIG. 1(a).

Figure 1B:
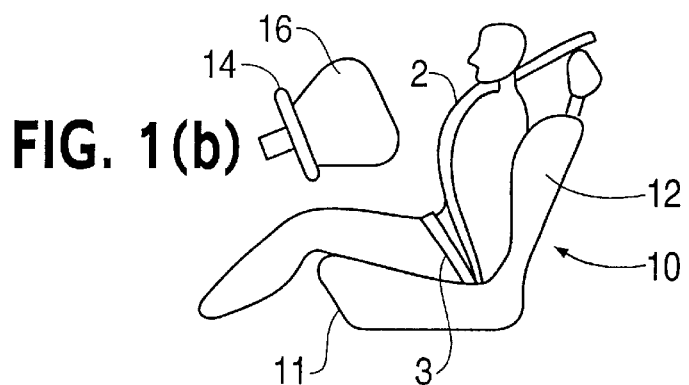

(2) When the impact scale is relatively small, (greater than the slight value and less than a small value) only the first inflators 21, 31 are activated to supply a decreased amount of gas to the airbag 16 and the air belt 2. Thus, as shown in FIG. 1(b), the airbag 16 and the air belt 2 are expanded relatively slowly such that the pressure in the airbag 16 and the pressure in the air belt 2 are not increased greatly. Accordingly, the passenger P is stopped by the air belt that is expanded loosely, and, if the passenger P hits the airbag 16, the passenger P is received by the airbag 16, which is expanded loosely.

Figure 1C:
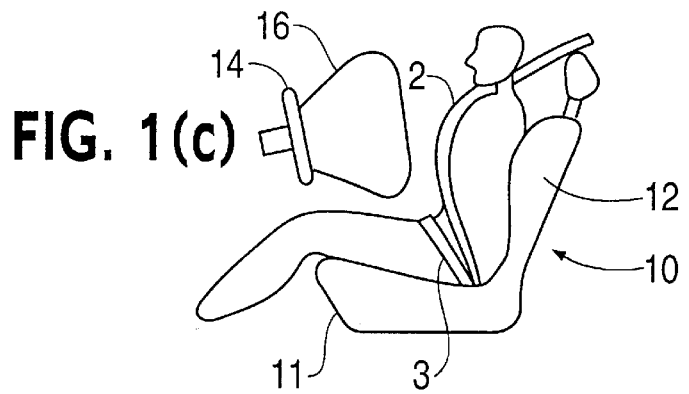

(3) When the impact scale is intermediate (greater than the small value and less than an intermediate value) the first and second airbag inflators 31, 32 are activated to inflate the airbag 16 rapidly and tightly, as shown in FIG. 1(c) Meanwhile, only the air-belt first inflator 21 is activated to inflate the air belt 2 relatively slowly such that the pressure in the air belt 2 is not increased greatly. Accordingly, the passenger P is stopped by the air belt that is expanded loosely. Further, although the passenger P's head and body hit the airbag 16 at a relatively high speed, the passenger P is received by the airbag 16, which is tightly expanded with an increased pressure. This absorbs the shock sufficiently.

Figure 1D:
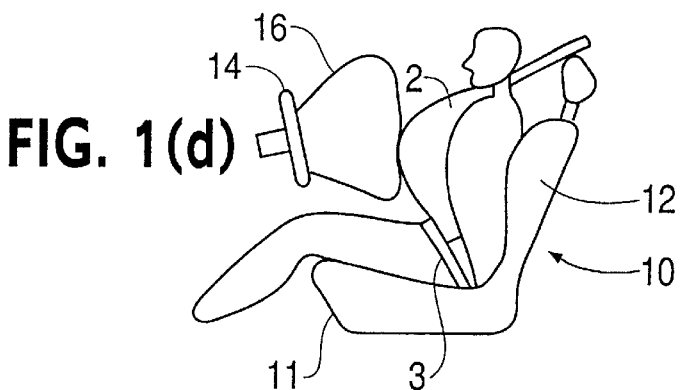

(4) When the impact scale is relatively large (greater than the intermediate value) and less than a large value the first and second airbag inflators 31, 32 and the first and second air-belt inflators 21, 22 are all activated, and the airbag 16 and the air belt 2 are inflated rapidly and tightly, as shown in FIG. 1(d). Thus, the pressure in the airbag 16 and the pressure in the air belt 2 are sufficiently increased. Accordingly, the passenger P is stopped by the air belt 2, which is expanded tightly. Further, although the passenger P's head and body hit the airbag 16 at a relatively high speed, the shock is absorbed sufficiently.

OPERATION EXAMPLE 2

Control Procedure in Accordance with a Detection Signal from the Weight Sensor 13 Indicating that the Weight of the Passenger P is Relatively Small In this case, when the impact scale is slight or relatively small, the airbag 16 and the air belt 2 remain non-inflated, as shown in FIG. 1(a). When the impact scale is intermediate, the airbag 16 and the air belt 2 are expanded loosely only by the associated first inflators 21, 31, as shown in FIG. 1(b). When the impact scale is relatively large, the first and second airbag inflators 31, 32 and one air belt inflator 21 are activated, as shown in FIG. 1(c). When the impact scale is extremely large (greater than the large value), the air belt inflators 21, 22 and the airbag inflators 31, 32 are all activated.

CONTROL OPERATION EXAMPLE 3

Control Procedure in Accordance with a Detection Signal from the Weight Sensor 13 Indicating that the Weight of the Passenger P is Relatively Large In this case, even when the impact scale is slight, the airbag 16 and the air belt 2 are expanded loosely by the associated first inflators 21, 31, as shown in FIG. 1(b). When the impact scale is relatively small, the first and second airbag inflators 31, 32 and one air belt inflator 21 are activated. When the impact scale is intermediate or larger, the air belt inflators 21, 22 and the airbag inflators 31, 32 are all activated.

As indicated by the above examples 1, 2, and 3, the device of the present invention reliably protects the passenger P by means of the airbag and the air belt in accordance with the crash impact scale.

Although the airbag device 15 is provided for a driver's seat in this embodiment, it is clear that the device 15 may be provided for a passenger seat adjacent to the driver's seat or a rear seat. Further, although the airbag device and the air belt assembly of this embodiment each have a pair of inflators, three or more inflators may be employed. Also, an inflator continuously varying the gas generation amount may be employed. In addition, the present invention may employ an inflator controlling the amount of the gas supplied to the airbag or the air belt by escaping some gas generated by the inflator.

In the state of FIG. 1(*c*) of the embodiment, the airbag 16 is fully expanded while the air belt 2 is expanded loosely In contrast, the air belt 2 may be fully expanded while the airbag 16 is expanded loosely. However, if the device is provided for the driver's seat, it is preferred that the airbag 16 is fully expanded in the state shown in FIG. 1(*c*), since the gap between the steering wheel and the driver is relatively short.

As described, the present invention is capable of protecting a passenger by controlling the inflating amount of the airbag and that of the air belt in accordance with the crash impact scale, or, alternatively, the crash impact scale and the weight of the passenger. Accordingly, it is to be understood that the present invention is not limited to the details of any one embodiment in any one figure, but are defined by the appended claims. The scope of the appended claims should be interpreted to encompass all such modifications, similar arrangements and procedures.

I claim:

1. A passenger protection device for a vehicle comprising:
    an airbag device having an airbag and an airbag gas generator for inflating the airbag by supplying gas to the interior of the airbag and the airbag device configured to be located forward of a vehicle passenger;
    an air belt assembly having an inflating portion and an air-belt gas generator for inflating the inflating portion by supplying gas to the interior of the inflating portion in at least two different adjustable amounts, each of the adjustable amounts being greater than zero; and
    a control unit controlling the airbag gas generator and the air-belt gas generator in response to a crash of the vehicle and operating to increase the adjustable amount of gas generated by the air-belt gas generator in accordance with an increase of the expected crash impact.

2. The passenger protection device of claim 1, wherein the control unit operates to increase the amount of gas generated by the airbag gas generator in accordance with the increase of the expected crash impact.

3. The passenger protection device of claim 2, wherein the expected crash impact is detected by an acceleration change of the vehicle.

4. The passenger protection device of claim 1, wherein the air-belt gas generator and the airbag gas generator are configured to increase their gas generating amount in a stepped manner.

5. The passenger protection device of claim 1, wherein the control unit is configured to increase the amount of gas generated by the air-belt gas generator in a continuous manner.

6. The passenger protection device of claim 1, wherein the following protocol is utilized:
    (1) when the crash impact is expected to be on a very small scale, the airbag gas generator and the air-belt gas generator are not activated;
    (2) when the crash impact is expected to be on a small scale larger than the very small scale, the airbag gas generator inflates a portion of the airbag and the air-belt generator inflates a portion of the air-belt;
    (3) when the crash impact is expected to be on a moderate scale greater than the small scale, the airbag gas generator inflates the airbag fully and the air-belt gas generator inflates a portion of the air-belt; and
    (4) when the crash impact is expected to be on at least a large scale greater than the moderate scale, the airbag gas generator inflates the airbag fully and the air-belt gas generator inflates the air-belt fully.

7. The passenger protection device of claim 1, further comprising a weight detecting means for detecting the weight of the passenger seated in the vehicle; and
    wherein the control unit operates to increase the gas generating amount of at least the air-belt gas generator or the airbag gas generator in accordance with an increase of the weight detected by the weight detecting means.

8. The passenger protection device of claim 7, wherein the following protocol is utilized when the weight detected is small:
    (1) when the crash impact is expected to be on a very small scale, the airbag gas generator and the air-belt gas generator are not activated;
    (2) when the expected crash impact is expected to be on a small scale larger than the very small scale, the airbag gas generator and the air-belt gas generator are not activated;
    (3) when the expected crash impact is expected to be on a moderate scale larger than the small scale, the airbag gas generator inflates a portion of the airbag and the air-belt gas generator inflates a portion of the air-belt;
    (4) when the expected crash impact is expected to be on at least a large scale larger than the moderate scale, the airbag gas generator inflates the airbag fully and the air-belt gas generator inflates the air-belt loosely; and
    (5) when the crash impact is expected to be on a very large scale larger than the large scale, the airbag gas generator inflates the airbag fully and the air-belt gas generator inflates the air-belt fully.

9. The passenger protection device of claim 7, wherein the following protocol is utilized when the weight detected is at least a moderate value or at least a large value greater than the moderate value:
    (1) when the crash impact is expected to be on a very small scale, the airbag gas generator inflates a portion of the airbag and the air-belt gas generator inflates the air-belt loosely;
    (2) when the crash impact is expected to be on at least a small scale greater than the very small scale, the airbag gas generator inflates the airbag fully and the air-belt generator inflates the air-belt loosely; and
    (3) when the crash impact is expected to be on a moderate scale larger than the small scale, the airbag gas generator inflates the airbag fully and the air-belt gas generator inflates the air-belt fully.

10. A passenger protection device for a vehicle comprising:
    an airbag located forward of a vehicle passenger and an airbag gas generator for inflating the airbag by supplying gas to the interior of the airbag;
    an inflatable air-belt and an air-belt gas generator for inflating the air-belt by supplying gas to the interior of the air-belt; and
    a control unit for controlling the airbag gas generator and the air-belt gas generator in response to a crash of the vehicle; and wherein the control unit controls the air-belt gas generator to generate an amount of gas greater than zero based on an expected crash impact and operates to increase the amount of gas generated by the air-belt gas generator when the expected crash impact increases.

11. The device of claim 10, wherein the control unit operates to increase the amount of gas generated by the air-belt gas generator in a continuous manner.

12. The device of claim 10, wherein the control unit operates to increase the amount of gas generated by the air-belt gas generator in a stepped manner.

13. The device of claim 10, wherein the air-belt gas generator is configured to generate at least two different amounts of gas.

14. The device of claim 10, wherein the control unit determines the expected crash impact by an acceleration change in the vehicle.

15. The device of claim 10, wherein the control unit controls the airbag gas generator to generate an amount of gas based on the expected crash impact.

16. The device of claim 15, wherein the control unit operates to increase the amount of gas generated by the airbag gas generator when the expected crash impact increases.

17. The device of claim 16, wherein the airbag gas generator is configured to generate at least two different amounts of gas.

18. The device of claim 15, wherein the control unit determines the expected crash impact by an acceleration change in the vehicle.

19. The device of claim 10, wherein the control unit is configured so that:

1) when the expected crash impact is less than a slight value the control unit does not activate the airbag gas generator and air-belt gas generator;
2) when the expected crash impact is greater than the slight value but less than a small value the control unit controls the airbag gas generator to generate a first amount of gas and the air-belt gas generator to generate a second amount of gas;
3) when the expected crash impact is greater than the small value but less than an intermediate value the control unit controls the airbag gas generator to generate an amount of gas greater than the first amount of gas and the air-belt gas generator to generate the second amount of gas; and
4) when the expected crash impact is greater than the intermediate value the control unit controls the airbag gas generator to generate an amount of gas greater than the first amount of gas and the air-belt gas generator to generate an amount of gas greater than the second amount of gas.

20. The device of claim 10, further comprising a weight sensor for detecting the weight of the passenger, the weight sensor supplying a detection signal to the control unit.

21. The device of claim 20, wherein the control unit is configured so that when the detection signal received at the control unit indicates that the weight of passenger is less than a predetermined weight the control unit operates as follows:

1) hen the expected crash impact is less than a small value the control unit does not activate the airbag gas generator and air-belt gas generator;
2) when the expected crash impact is greater than the small value but less than an intermediate value the control unit controls the airbag gas generator to generate a first amount of gas and the air-belt gas generator to generate a second amount of gas;
3) when the expected crash impact is greater than the intermediate value but less than a large value the control unit controls the airbag gas generator to generate an amount of gas greater than the first amount of gas and the air-belt gas generator to generate the second amount of gas; and
4) when the expected crash impact is greater than the large value the control unit controls the airbag gas generator to generate an amount of gas greater than the first amount of gas and the air-belt gas generator to generate an amount of gas greater than the second amount of gas.

22. The device of claim 20, wherein the control unit is configured so that when the detection signal received at the control unit indicates that the weight of passenger is greater than a predetermined weight the control unit operates as follows:

1) when the expected crash impact is less than a slight value the control unit controls the airbag gas generator to generate a first amount of gas and the air-belt gas generator to generate a second amount of gas;
2) when the expected crash impact is greater than the slight value and less than a small value the control unit controls the airbag gas generator to generate an amount of gas greater than the first amount of gas and the air-belt gas generator to generate the second amount of gas; and
3) when the expected crash impact is greater than the small value the control unit controls the airbag gas generator to generate an amount of gas greater than the first amount of gas and the air-belt gas generator to generate an amount of gas greater than the second amount of gas.

* * * * *